United States Patent [19]
Belin

[11] 3,739,584

[45] June 19, 1973

[54] FLOATING BARRIER FOR CIRCUMSCRIBING OIL POOLS OR LIKE REFUSE

[76] Inventor: Marcel André Belin, 11 rue Voltaire, Nantes (44 Loire Atlantique), France

[22] Filed: June 1, 1971

[21] Appl. No.: 148,473

[52] U.S. Cl. ......................................... 61/1 F, 61/5
[51] Int. Cl. ........................................... E02b 15/04
[58] Field of Search .................... 61/1, 5; 210/242, 210/DIG. 21; 114/235 R

[56] References Cited
UNITED STATES PATENTS

| | | | |
|---|---|---|---|
| 3,612,280 | 10/1971 | Fitzgerald | 210/242 |
| 3,221,884 | 12/1965 | Muller | 210/242 |
| 3,321,923 | 5/1967 | Smith et al. | 61/1 |
| 2,652,550 | 9/1953 | Lash | 114/235 R X |
| 3,638,430 | 2/1972 | Smith | 61/1 F |

FOREIGN PATENTS OR APPLICATIONS

| | | | |
|---|---|---|---|
| 77,350 | 1/1962 | France | 61/1 |
| 1,305,469 | 8/1962 | France | 61/1 |

*Primary Examiner*—David J. Williamowsky
*Assistant Examiner*—David H. Corbin
*Attorney*—Young & Thompson

[57] ABSTRACT

A floating barrier for circumscribing and trapping oil films or like refuse in harbors and other bodies of water comprises a strip of noncorrodible material such as stainless steel and pair of buoyant floats removably fitted at intervals on oposite sides of the strap so as to support it vertically in the body of water. Junction means interconnect the floats pairwise and are removably engaged through the strip. A pair of watertight stabilizing compartments is removably secured to opposite sides of an end portion of the strip and are connectible to a hauling or towing craft.

3 Claims, 4 Drawing Figures

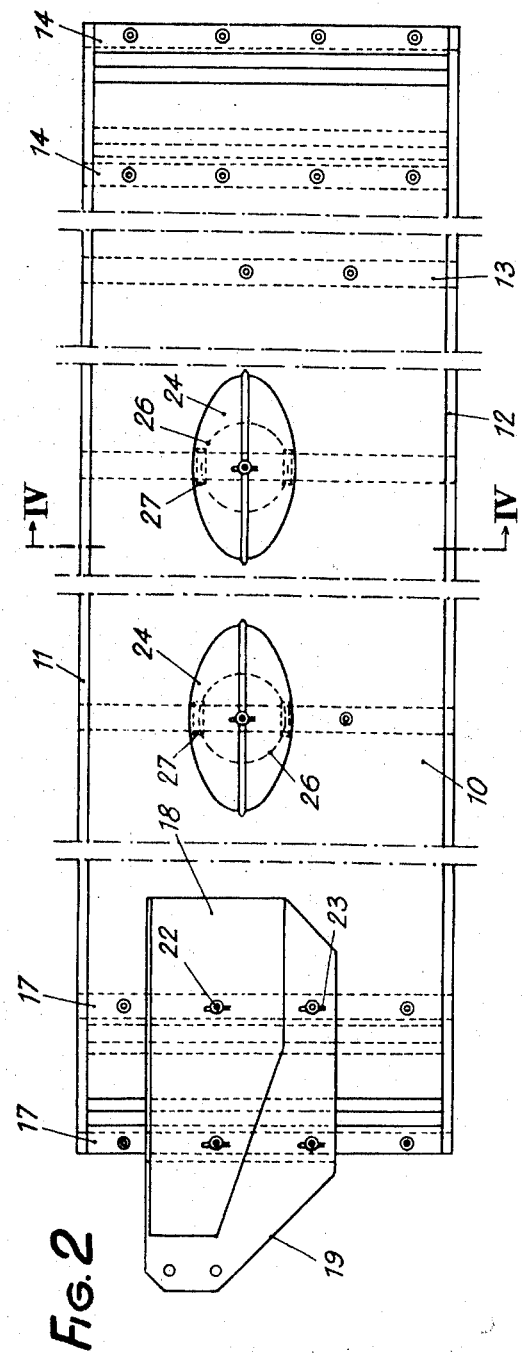
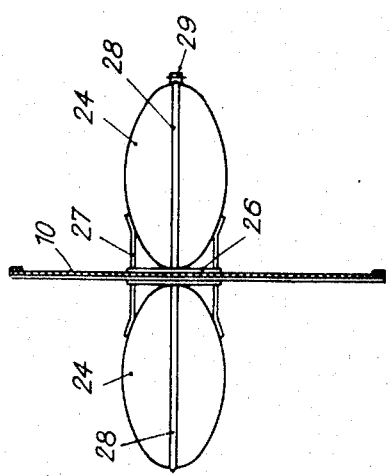
Fig. 2
Fig. 4
INVENTOR
MARCEL ANDRE BELIN
By Young + Thompson
ATTYS.

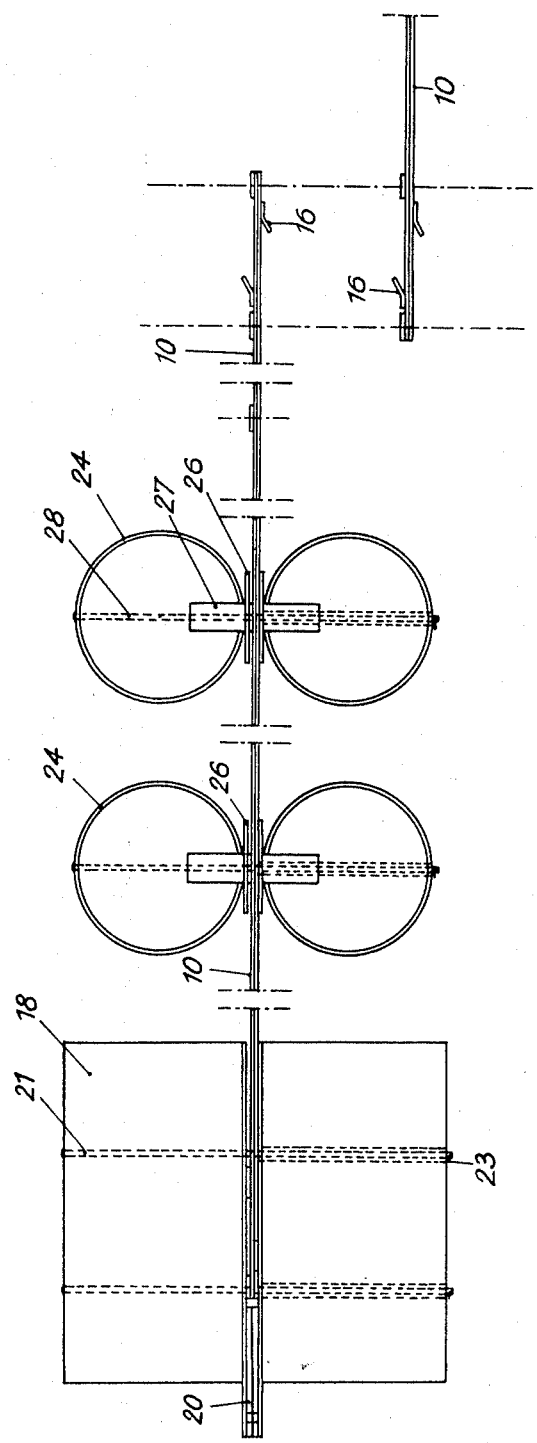

FLOATING BARRIER FOR CIRCUMSCRIBING OIL POOLS OR LIKE REFUSE

As is known, with the gradual development of oil transportation by specially equipped ships known as "tankers" it is a frequent occurrence that the loading and unloading of oil products or hose failures, also shipwreck of such ships or tankers at sea or their collision with other ships especially in foggy weather often give rise to storage tank spilling or similar events, whereby the whole or a fraction of their oil cargo flows into the sea and may seriously spoil or pollute sea water, thus creating what is commonly known as a "black tide" which pollutes sea water and shores, beaches and other places of economic or touristic interest in the environment.

There is therefore an urgent need for preventing the spreading of oil pools or sheets following shipwrecks of such oil transportation ships or tankers so as to stave off the detrimental disadvantages of oil spreading in sea or large lake waters, for example in harbors, ports or similar sea or lake stretches.

The primary object of the invention is to provide a towable floating barrier of novel construction utilizable for circumscribing and trapping oil pools or sheets or like refuse in harbors or ports or along shores, river estuaries or similar sea or large lake stretches so as to avoid the aforesaid disadvantages whether or not the oil mass thus spread in sea or lake water is in fluid and non-ignited state or has been set on fire following various accidents due to shipwreck.

Another object of the invention is to provide a floating barrier as aforesaid entirely made of rustless or non-corrodible metal, alloy or equivalent material so as to withstand corrosion or degradation by sea or lake water, also flames if somehow the oil film being circumscribed by the action of the barrier has been set on fire.

A further object of the invention is to provide a floating barrier as aforesaid specially conceived to be held in substantially vertical condition notwithstanding waves, billows or a more or less pronounced surge by buoyant floats or members equipped with means which reinforce the barrier and render it more sturdy and weather or storm resistant.

A still further object of the invention is to provide a floating barrier as aforesaid comprising a strip which can be made in any suitable length or linked to similar strips to constitute a more extensive barrier of such a size as to be capable of circumscribing and trapping an oil film or sheet, irrespective of its perimeter, linking of the several elements of the floating barrier being performed by interconnecting bonds which may be used for rendering the barrier assembly still more sturdy or for fastening in proper position watertight stabilizing bins.

With these and such other objects in view as will incidentally appear hereafter, the invention comprises the novel construction and combination of parts or elements that will be now described with reference to the accompanying diagrammatic drawings exemplifying the same and forming a part of the present disclosure.

In the drawings:

FIG. 2 is an elevational fragmentary side view of the floating barrier as shown isometrically in FIG. 1 but viewed from the opposite side and with cut away portions.

FIG. 3 is fragmentary a top plan view corresponding to FIG. 2, this view also showing the leading end of another strip.

FIG. 4 is a sectional view taken on the line IV—IV in FIG. 2.

Like reference numerals designate like parts throughout the several views.

Figure 1:
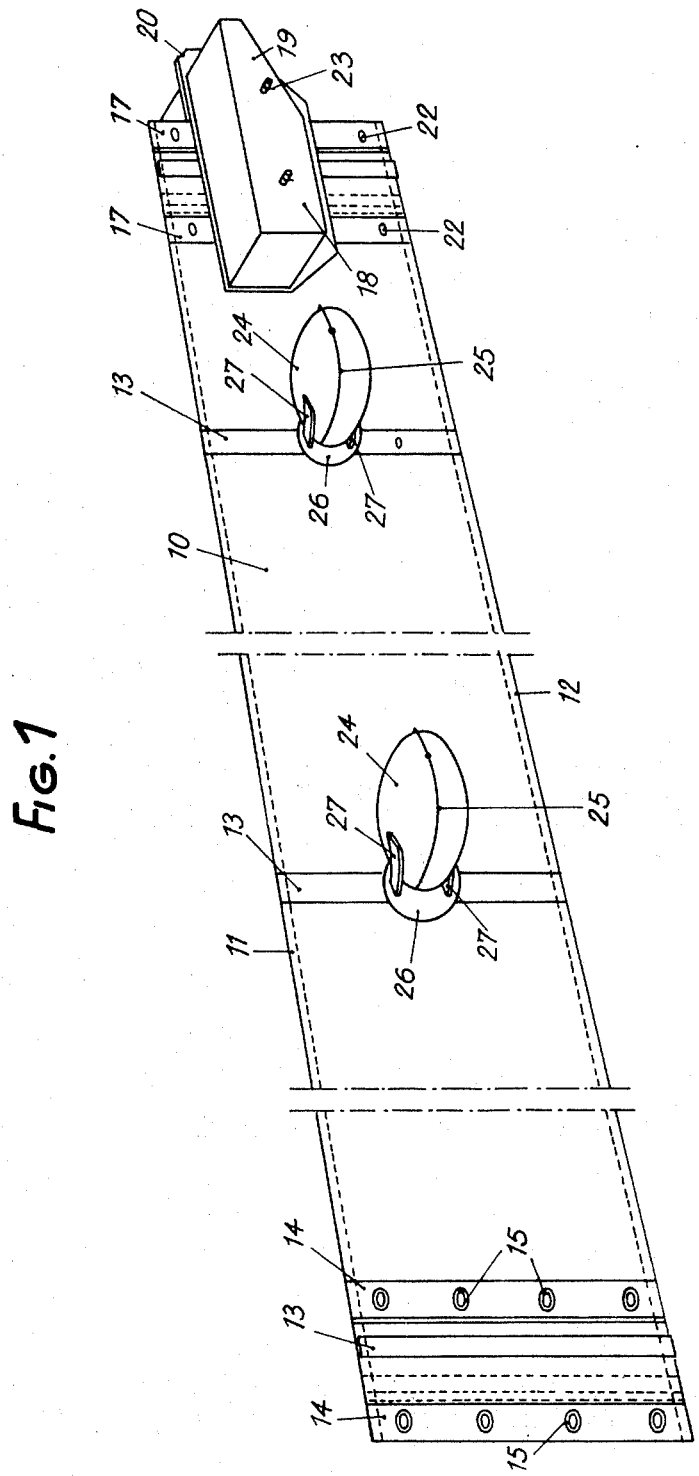
FIG. 1 is an isometric view showing from one side a strip fitted at intervals with floats and at its right hand side end with stabilizing compartments.

As illustrated, the floating barrier for circumscribing and trapping oil films or sheets or like refuse, for instance in harbors or ports or in similar sea or large lake stretches comprises a flexible or distortable strip generally designated by 10 which is advantageously made of a rustless or non-corrodible metal, alloy or similar sheet-like material such as stainless steel the thickness of which may be for example from 2 to 5 millimeters, the width of said strip being for example equal to about one meter while its length may be equal for example to a unitary measure such as 25 or 50 meters.

The strip 10 is provided along its upper and lower edges with reinforcing strips 11,12 and across its width at suitable intervals with reinforcing strips or braces 13. Adjacent the rear end of the strip 10 extend transverse strips or bars 14 having holes 15 through which links or bonds such as cables or guys (not shown) may be engaged for interconnecting the strip 10 with a similar strip such as the one shown in FIG. 3. Tongues or lips 16 are provided on the meeting ends of the two strips.

Adjacent the front end of the strip 10 extend likewise reinforcing transverse strips or braces 17 fulfilling a function similar to the strips or braces 13. Along both flanks of the front end portion of the strip 10 are provided a pair of elongated watertight compartments 18 the general shape of which is rectangular but having on its lower face with a forwardly and upwardly extending sloping wall 19 facilitating penetration of said compartments through the water when the strip 10 is towed for example by a tug-boat as hereinafter described. Between each compartment 18 and the contiguous face of the strip 10 is interposed a holding and reinforcing plate 20. Transverse pins such as 21 are engaged through holes 22 in the braces 17 and through matching holes in the plates 20 and in the walls defining the enclosures forming the compartments 18. At their outer ends the transverse pins 21 are held in position by removable clips such as 23.

The assembly of the front end portion of the strip 10, plates 20 and bins 18 may be disassembled. The purpose of the watertight compartments 18 is to impart stability and more mechanical resistance to the front end portion of the strip 10. The latter may be towed by links or cables engaged through suitable holes such as 22 for example for being towed by a tug-boat to the proper site such as a suitable position in a harbor or along a shore so as to circumscribe and trap an oil film or sheet or more generally a mass of refuse floating in the sea, thereby preventing the same from spreading in non-controlled fashion.

As suitable intervals along the strip 10 are provided on both sides thereof floats 24 of spheroidal shape as shown. Each float is made up of a pair of shells interconnected along their contiguous rims by a tight welding bead such as 25. Rearwardly of each float 24 is secured an upright plate 26 extending parallel with the corresponding side face of the strip 10 and rigidly connected with the float by a pair of bracing links 27 (see FIG. 4) which partake of the general rigidity and stability of the floats 24. A cross pin such as 28 is diametrically secured to one float of a pair, for example by being welded thereto and freely passes through holes in the plates 26 and through holes in the braces 13 on the opposide sides of the strap 10. The cross pin 28 freely passes through the other float in the pair and protrudes outside its outer surface, its protruding end being removably held by clips such as 29 similar to the clips 23 holding in position the stabilizing compartments 18.

Due to this construction, the compartments 18 and floats 24 may be easily assembled to the strip 10 or disassembled therefrom. Before being used, the strip 10 may be rolled up due to its flexibility and stowed in a limited volume upon a reel which may be for example revolubly supported on bearings or headstocks on a ship whence the strap can be unrolled and then equipped with floats and compartments preliminarily to its placement in operative position.

The action of the floats 24 is to hold the strip 10 in vertical or substantially vertical position, thereby enabling the same to perform its duty as a floating barrier. The purpose of the compartments 18 is to impart stability to the strip or barrier 10 particularly when it is dragged or towed to its operative site or position, for example by being towed by a suitable craft.

Subject to the extent of the oil film or sheet to be circumscribed, combatted and trapped, the length of the strip or barrier eventually made up of several elements may be suitably selected according to circumstances.

Minor construction details may be varied without departing from the scope of the appended claims.

What is claimed is:

1. A floating barrier for circumscribing and trapping oil films and the like on a body of water, comprising a strip of noncorrodible metal, reinforcing means extending transversely of and along the longitudinal edges of said strip, means carried by a trailing end portion of the strip for interconnection with another said strip in end-to-end relationship so as to form an assembly of strips, a series of buoyant spheroidal floats of noncorrodible material removably secured to the strip at intervals along the length of the strip and on opposite side faces of the strip and spaced from 2. A floating barrier as claimed in claim 1, and plates secured against opposite sides of said strip between said floats.

3. A floating barrier as claimed in claim 1, said compartments extending forwardly of said strip.

* * * * *